United States Patent [19]
Ellinghausen et al.

[11] 3,739,132
[45] June 12, 1973

[54] POWER CONTROL CIRCUIT FOR RESISTANCE HEATING MOVING CONDUCTORS

[75] Inventors: Edgar A. Ellinghausen; George B. Johnson, both of Crystal Lake, Ill.

[73] Assignee: Interstate Drop Forge Co., Milwaukee, Wis.

[22] Filed: Dec. 1, 1971

[21] Appl. No.: 203,581

[52] U.S. Cl. .................. 219/50, 219/116, 323/20, 321/38
[51] Int. Cl. ............................................. H05b 1/02
[58] Field of Search ................ 219/50, 155, 10.61, 219/10.77, 108, 116; 323/20; 321/38

[56] References Cited
UNITED STATES PATENTS

| | | | |
|---|---|---|---|
| 3,311,734 | 3/1967 | Peterson | 219/50 |
| 3,476,910 | 11/1969 | Leath et al. | 219/50 X |
| 3,333,178 | 7/1967 | Van Allen et al. | 321/38 |
| 3,042,786 | 7/1962 | Babcock et al. | 219/50 |
| 3,324,274 | 6/1967 | Ives | 219/50 |
| 3,102,223 | 8/1963 | Burnett | 321/38 |
| 3,398,252 | 8/1968 | Bock et al. | 219/155 X |

Primary Examiner—E. A. Goldberg
Assistant Examiner—B. A. Reynolds
Attorney—Carl F. Schaffer, Allen Owen and Oliver E. Todd Jr. et al.

[57] ABSTRACT

A circuit for regulating the temperature to which a moving conductor such as a wire or rod is heated. The conductor is electrically heated by the Joule effect as it passes between two or more electrical contacts. Current in the conductor is controlled in response to both the temperature and the speed of the conductor.

3 Claims, 1 Drawing Figure

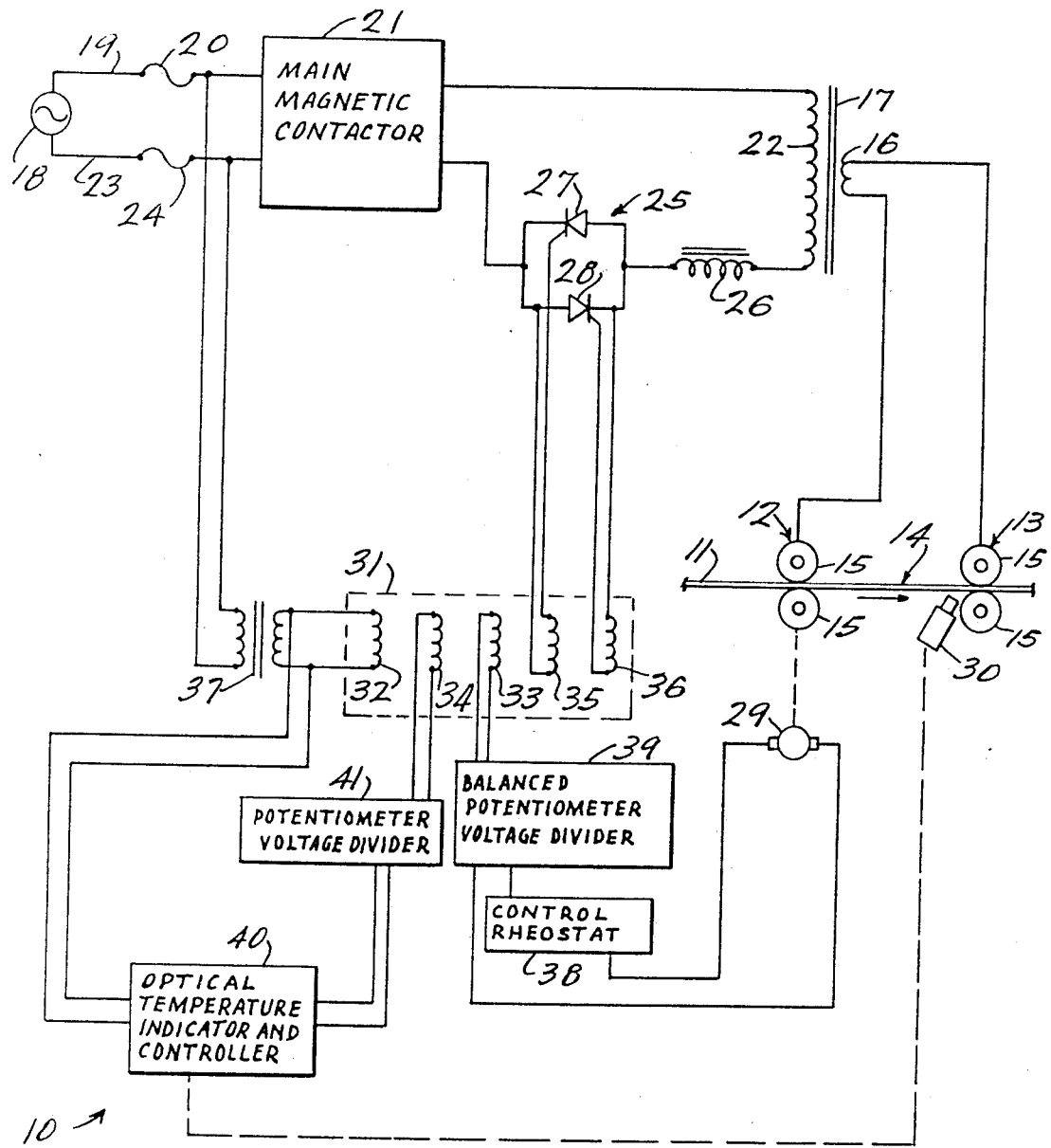

POWER CONTROL CIRCUIT FOR RESISTANCE HEATING MOVING CONDUCTORS

BACKGROUND OF THE INVENTION

This invention relates to electrical heating and, more particularly, to a power control circuit for electrically heating a moving conductor such as an elongated wire or rod.

A variety of electrical resistance heating arrangements have been constructed in the past for heating moving conductors such as metallic rods, wires, tubes, sheets and the like. Typically, current is applied to the conductor as it moves between two or more spaced electrical contacts. The portion of the conductor between the contacts is resistance heated through the Joule effect. However, problems have occurred in regulating the temperature to which the moving conductor is heated. Temperature regulating problems are particularly severe where fluctuations occur in the speed of the moving conductor. If, for example, a conductor is collected on a spool driven at a constant speed, the speed of the conductor will increase when the diameter of the spool increases as layers of the conductor are wound on the spool. As the speed of the conductor increases, the electrical current required to heat the conductor to the same temperature increases. Speed fluctuations may also occur in production lines in which a moving wire, for example, may be heated to relieve stresses or to facilitate drawing the wire through a die.

In the past, attempts have been made to sense the temperature of the moving conductor and to use the sensed temperature for controlling current applied to the conductor. Such a system is disclosed in Peterson U.S. Pat. No. 3,311,734. However, controlling the current applied to the conductor in response to the sensed temperature has not been altogether satisfactory for regulating the temperature to which the conductor is heated. This has been due, at least in part, to the fact that the sensed temperature is affected by the emissivity of the surfaces of the conductor. The emissivity of the conductor is influenced by the finish and smoothness of the surface and by irregular coatings on the surface such as grease and dirt. Fluctuations in the sensed temperature will cause the system to hunt, resulting in wide fluctuations in the temperature to which the conductor is heated.

Another problem with controlling current in response to the sensed temperature occurs because the temperature of the moving conductor varies as a function of the sensing location between the spaced electrical contacts and as a function of the past current history through the portion of the conductor passing the temperature sensor. The portion of the conductor entering the region between the contacts is at its coolest temperature, while the portion of the conductor just leaving this region has been heated to a maximum temperature. Since the important temperature, or control temperature, is usually the maximum temperature, the temperature sensing is necessarily done in the heating region at the final contact. At this point, all of the heating has been accomplished. When a correction in temperature is called for, the heating rate is changed throughout the entire region between the contacts. It is not, however, until one complete contact spacing of conductor has passed through the heating region that the sensor gets the full effect of the change that has been produced. At this point, however, there is already another length of conductor between the contacts which has, also, been partially heated at the new rate and, therefore, an inevitable period of over-shoot exists. Due to the total lack of "thermal inertia" in this method of heating, and the resultant rapid response to changes in the applied heating power, the above phenomena always results in progressively larger oscillations or hunting in the maximum temperature to which the conductor is heated. This phenomena may be reduced by using a slowly responding controller, although this results in other control problems.

If the current which heats the moving conductor is controlled in response to the speed of the conductor, the system will be non-linear and will not maintain a constant temperature throughout a wide speed range. Furthermore, the conductor temperature will be affected by changes in properties of the conductor, such as in the cross-sectional area of the conductor.

SUMMARY OF THE INVENTION

According to the present invention, an improved circuit is provided for controlling electrical power used in resistance heating a moving conductor. The power is controlled to accurately regulate the temperature to which the moving conductor is heated. Power is applied to the conductor between at least two spaced contacts. Both the speed of the moving conductor and the temperature to which the conductor is heated are sensed. Controlled conduction devices, such as a pair of silicon controlled rectifiers, are used for controlling primary current in a power transformer which supplies power to the spaced contacts. Signals corresponding to the sensed conductor speed and the sensed temperature of the conductor are summed and used for controlling conduction by the silicon controlled rectifiers. The proportion of the current to the power transformer controlled by the speed signal and the portion controlled by the temperature signal may be varied for the particular requirements of the conductor being heated. Controlling the conduction of the silicon controlled rectifiers in response to the sensed speed and temperature will maintain the temperature to which the conductor is heated constant, with a minimum amount of hunting, over a wide range of speeds at which the conductor may be moving. In a preferred form, from 5 to 20 percent of the power output from the rectifiers is controlled in response to the sensed temperature and from 80 to 95 percent is controlled in response to the sensed speed.

It is therefore a principal object of the invention to provide an improved power control for use with apparatus for resistance heating a moving elongated conductor.

Another object of the invention is to provide an improved power control circuit for use with apparatus for resistance heating a moving conductor in which variations in the temperature to which the conductor is heated are minimized.

Other objects and advantages of the invention will become apparent from the following detailed description, with reference being made to the accompanying drawing.

BRIEF DESCRIPTION OF THE DRAWING

The single FIGURE shows a schematic block diagram of power control apparatus constructed in accordance with the present invention.

DESCRIPTION OF THE PREFERRED EMBODIMENT

Referring now to the drawing, apparatus 10 is shown for applying a controlled current to a segment of a moving conductor 11 for resistance heating the conductor 11 by means of the Joule effect. The conductor 11 may, for example, comprise a solid wire which is heated prior to drawing or otherwise working or a solid or a stranded wire which is heated to relieve internal stresses. The wire or conductor 11 passes sequentially between a pair of contacts 12 and 13 which are spaced to form a heating zone 14 along the conductor 11. Beyond the contact 13, the heated conductor 11 may be drawn, shaped or otherwise worked, or it may be collected on a spool.

The contacts 12 and 13 may be of any suitable design for applying current to the moving conductor 11. However, for heating a wire conductor 11, the contacts 12 and 13 preferably each consist of a pair of disks or rollers 15. The rollers 15 are mounted to rotate as the wire moves between each roller pair in grooves in the periphery of the rollers 15. The two rollers 15 in each contact pair 12 and 13 are biased together hydraulically or by means of springs (not shown) to tightly pinch the wire 11 in the grooves, forming a good electrical connection between the wire 11 and the contact pairs 12 and 13.

Electrical power is applied between the contact pairs 12 and 13 from a secondary winding 16 of a power transformer 17. The power applied between the contacts 12 and 13 causes the cold wire entering at the contacts 12 to be heated in the zone 14. The heated wire 11 then passes between the pair of rollers 15 of the contact 13. The power transformer 17 is energized from a conventional alternating current power source 18 which, for example, may be either 230 volts or 460 volts at 50 to 60 Hertz. Power from one side 19 of the source 18 passes through a fuse 20 and a main magnetic contactor 21 to a primary winding 22 of the transformer 17. Power from a second side 23 of the source 18 passes through a fuse 24, the magnetic contactor 21, power control means 25 and an inductor choke 26 to the primary winding 22 of the power transformer 17. The main magnetic contactor 21 is a magnetic switch for opening and closing the high power circuit to the power transformer 17 which may carry as much as a thousand amperes.

The actual amount of power delivered from the source 18 to the power transformer 17 is determined by the power control means 25. The power control means 25 may consist of a thyratron or, preferably, a thyristor such as a silicon controlled rectifier. As shown in the drawing, the power control means 25 consists of a pair of silicon controlled rectifiers 27 and 28. The rectifiers 27 and 28 have input and output electrodes connected in parallel between the power source 18 and the primary winding 22. However, the polarities of the rectifiers 27 and 28 are reversed so that the rectifier 27 controls power during half cycles of one polarity and the rectifier 28 controls power during half cycles of the opposite polarity. If the rectifiers 27 and 28 are triggered or fired at the beginning of each half cycle, full power will be applied from the source 18 to the primary winding 22. If, however, the phase of the firing of the rectifiers 27 and 28 is delayed in each half cycle, power supplied to the primary winding 22 is reduced. This power control method is sometimes referred to as conduction angle control of the silicon controlled rectifiers.

The current applied to the primary winding 22 of the transformer 17 must be accurately controlled for heating the wire 11 to a substantially constant temperature. The required current for heating the wire 11 is a function of the mass of wire heated in any given period of time and is affected by such variables as the speed of the moving wire 11 and changes in diameter of the moving wire 11.

The speed of the moving wire 11 is sensed by means of a conventional tachometer 29 which may be driven by one of the contact rollers 15. The rollers 15 may be driven by a motor (not shown) for moving the wire 11, or they may be rotated by the wire 11 as it is pulled through the contacts 12 and 13. The tachometer 29 generates a signal proportional to the speed of the moving wire 11.

The wire 11 is also monitored for its temperature immediately prior to passing through the contact 13. The temperature is preferably sensed by means of a conventional optical infrared sensor 30. The optical sensor 30 generates a signal proportional to the infrared temperature of the wire 11 as it passes through a sensing zone. However, the sensed temperature will vary with the emissivity of the wire, even though the actual temperature of the wire may be constant. The emissivity is affected by the roughness of the surface of the wire 11 and by any surface coatings such as oxides, grease and dirt.

The speed and temperature signals from the tachometer 29 and the optical infrared sensor 30, respectively, are used for controlling conduction of the silicon controlled rectifiers 27 and 28. These signals are summed, for example, in a magnetic amplifier 31. It will, of course, be appreciated that other known devices and circuits may be used for summing the temperature signal and the speed signal for controlling conduction of the rectifiers 27 and 28.

The magnetic amplifier 31 is of a conventional design and preferably includes at least five windings: a power input winding 32, a pair of control windings 33 and 34, and a pair of load windings 35 and 36. Power is applied to the primary winding 32 from a control transformer 37 which is connected to the source 18. The transformer 37 will cause a phase lag in the power applied to the winding 32 from the source 18. This power is transferred through a saturable magnetic core in the amplifier 31 to the load windings 35 and 36, which are connected to the gate electrodes of the silicon controlled rectifiers 27 and 28, respectively. The amount of power actually transferred to the load windings 35 and 36 is determined by the degree to which the core of the magnetic amplifier 31 is saturated by the control windings 33 and 34.

The output of the tachometer 29 is connected through a control rheostat 38 and a balanced potentiometer voltage divider 39 to the control winding 33. The potentiometer voltage divider 39 is used for setting the response span of the magnetic amplifier 31 to the output of the tachometer 29. The tachometer 29 has an analog output signal which increases in magnitude with increased speed of the wire 11. If the wire 11 is moving in the range of a predetermined number of lineal feet per minute, such as 100 feet per minute, plus or minus a speed variation factor, the voltage divider 39 is set to permit control of firing of the rectifiers 27 and 28 by means of the control rheostat 38 from 0 to 100 percent of the power applied to the transformer 17 for this speed range. If, on the other hand, the wire 11 is moving at a much higher speed, such as 800 lineal feet per minute, the voltage divider 39 must be reset for the higher voltage output from the tachometer 29 to give a 0 to 100 percent control over the power applied to the transformer 17 by means of the control rheostat 38.

The optical infrared sensor 30 is connected to an optical temperature indicator and controller 40. The indicator and controller 40 may include a gauge or similar readout device for indicating the temperature of the wire 11, as sensed by the sensor 30. The indicator and controller 40 may also include an amplifier or similar circuitry for generating an analog output proportional to the sensed temperature. The output from the temperature indicator and controller 40 is applied through a potentiometer voltage divider 41 to the control winding 34 of the magnetic amplifier 31. The potentiometer 41 may be set to control from 0 to 100 percent of the power applied through the controlled conduction means 25 to the transformer 17. Thus, the power applied to the transformer 17, and hence the power applied to heat the wire 11, may be controlled either as a function of the speed of the wire 11 or as a function of the sensed temperature of the wire 11. In addition, the magnetic amplifier 31 which sums the two signals permits control over a portion of the applied power in response to the sensed speed of the wire 11 and of the remaining portion of the applied power in response to the sensed temperature of the wire 11.

Due to the facts that surface conditions can affect the emissivity for a given wire alloy and that the high lineal speed of the wire 11 can cause a slight deflection or side motion in the wire 11 as it passes the infrared sensor 30, it is usually desirable to control 80 to 95 percent of the power applied to the primary winding 22 of the power transformer 17 with the speed signal generated by the tachometer 29. The remaining 5 to 20 percent of the applied power is controlled in response to the temperature signal from the infrared sensor 30. However, even if the temperature sensor is accurate, it is desirable to control only a portion of the applied power, preferably from about 5 percent to about 20 percent of the applied power, with the temperature signal. This is due to the lack of thermal inertia in the system and due to the delay in time after the applied current is changed until a portion of the wire 11 heated entirely by the changed current passes the infrared sensor 30. Thus, the speed of the moving wire 11 will control the majority of the power for heating the wire 11 to any given temperature and the sensed temperature will be used as a trim or fine control for the remainder of the power. Under certain conditions, it may be desirable to control the power entirely from the speed signal or entirely from the temperature signal. The control rheostat 38 and the potentiometer voltage divider 44 permit such control over the power applied to the wire 11 through the contacts 12 and 13. It is, however, usually undesirable to control the power entirely as a function of the speed signal from the tachometer 29. In many plants the speed of the wire 11 is independent of the line voltage. The wire 11 may, for example, be pulled past the contacts by means of a synchronous motor having a speed proportional to the line frequency and independent of the line voltage. In this case, the speed of the wire will remain constant even though the current applied to the wire varies as a function of the line voltage. Hence, the maximum temperature to which the wire is heated would vary as a function of the line voltage. Since variations in the line voltage are usually within a limited range, only a relatively small percentage of the applied current need be controlled as a function of the sensed temperature, while the remainder is controlled as a function of the speed of the wire 11.

In operating the apparatus 10, the wire is initially positioned between the contacts 12 and 13 and is placed in motion. The voltage divider 39 and the control rheostat 38 are then used for bringing the wire temperature, as indicated on the indicator and controller 40, to within 25° F. to 50° F. of the desired run temperature. The desired run temperature for the wire 11, for example, might be within the range of 600° F. to 800° F. After the wire is brought to within 25° F. to 50° F. of the desired run temperature, the potentiometer voltage divider 41 is used to control the remaining 5 to 20 percent of the applied power for obtaining the desired run temperature. These settings of the potentiometers 39 and 41 and the rheostat 38 will remain constant for the particular wire 11 being run and for the particular speed of the wire plus or minus a speed range of perhaps 20 percent or more. Whenever a similar run is made on the same type of wire 11, the potentiometers 39 and 41 and the rheostat 38 may be reset to the same settings and the wire 11 will be heated to the same temperature. By using both the speed and the temperature of the wire 11 for controlling the power applied to heat the wire 11, the temperature to which the wire 11 is heated will remain constant over a wide range of conditions such as changes in wire speed, changes in the cross-sectional area of the wire and changes in the surface emissivity of the wire.

Since a major portion of the power is usually controlled in response to the output of the tachometer 29, this power will be removed from the contacts 12 and 13 should motion of the wire 11 stop. In this event, the only power applied to the wire 11 will be controlled in response to the temperature sensed by the infrared sensor 30 and this temperature will be limited by the setting of the potentiometer 41. Furthermore, changes in the emissivity of the moving wire 11 will have a minimum affect on the power applied to the contacts 12 and 13 for heating the wire 11 since usually only a small portion of the applied power is controlled in response to the sensed temperature. Thus, undesirable temperature hunting caused by emissivity changes is minimized.

It will be appreciated that various modifications and changes may be made in the above-described power control circuit without departing from the spirit and the scope of the claimed invention. Various types of temperature and speed sensors may, for example, be used in the above-described circuit. The magnetic amplifier 31 may also be replaced with other equivalent types of circuits for summing the control signals.

What we claim is:

1. In apparatus for resistance heating an elongated electrical conductor moving between spaced electrical contacts, an improved circuit for regulating the temperature of the heated conductor comprising, in combination, a step-down transformer having a primary winding and a secondary winding, means connecting said secondary winding to the spaced contacts for applying power to heat the portion of the moving conductor located between the contacts by the Joule effect, means for applying alternating current power to said primary winding, means for sensing the temperature of the heated conductor, means for sensing the speed of the moving conductor, controlled conduction means, means connecting said controlled conduction means in series with said primary winding and said power applying means, and means responsive to the sensed temperature and the sensed speed for establishing conduction by said controlled conduction means during at least a portion of each half cycle of the applied alternating current power, said conduction establishing means including a magnetic amplifier having at least an input winding, an output winding and two control windings, means for applying alternating current power to said input winding, means for applying a temperature signal from said temperature sensing means to one of said control windings for controlling the output of said magnetic amplifier, means for applying a speed signal from said speed sensing means to the other of said control windings for controlling the output of said magnetic amplifier, means connecting said output winding to control said controlled conduction means, to 20 percent of the power applied to the moving conductor in response to the sensed temperature and from 80 to 95 percent of the applied power in response to the sensed speed.

2. A circuit, as set forth in claim 1, including means for adjusting the temperature to which the moving conductor is heated.

3. A circuit, as set forth in claim 2, wherein said temperature adjusting means includes means for controlling the temperature signal applied to said one control winding, and means for controlling the speed signal applied to said other control winding.

* * * * *